(12) United States Patent
Shinkai (10) Patent No.: US 10,813,271 B2
(45) Date of Patent: Oct. 27, 2020

(54) WORK VEHICLE

(71) Applicant: Kubota Corporation, Osaka-shi (JP)

(72) Inventor: Atsushi Shinkai, Sakai (JP)

(73) Assignee: Kubota Corporation, Osaka (JP)

(*) Notice: Subject to any disclaimer, the term of this patent is extended or adjusted under 35 U.S.C. 154(b) by 105 days.

(21) Appl. No.: 16/089,680

(22) PCT Filed: Dec. 8, 2016

(86) PCT No.: PCT/JP2016/086595
§ 371 (c)(1),
(2) Date: Sep. 28, 2018

(87) PCT Pub. No.: WO2017/203734
PCT Pub. Date: Nov. 30, 2017

(65) Prior Publication Data
US 2019/0104675 A1    Apr. 11, 2019

(30) Foreign Application Priority Data

May 26, 2016 (JP) .................................. 2016-105364

(51) Int. Cl.
*A01B 63/112* (2006.01)
*A01B 79/00* (2006.01)
(Continued)

(52) U.S. Cl.
CPC ............ *A01B 79/005* (2013.01); *A01B 61/00* (2013.01); *A01B 63/112* (2013.01); *B60W 10/06* (2013.01);
(Continued)

(58) Field of Classification Search
CPC ... A01B 61/00; A01B 63/112; A01B 63/1145; A01B 63/023; A01B 71/02; A01B 79/005; B60W 10/06; B60W 10/30
(Continued)

(56) References Cited

U.S. PATENT DOCUMENTS 6,144,910 A * 11/2000 Scarlett ............... A01B 63/023
701/50
6,666,279 B2 * 12/2003 Scarlett ............... A01B 63/111
172/1
(Continued)

FOREIGN PATENT DOCUMENTS

EP    0838141 A2    4/1998
EP    2499893 A1    9/2012
(Continued)

*Primary Examiner* — Robert E Pezzuto
(74) *Attorney, Agent, or Firm* — The Webb Law Firm (57) ABSTRACT

A work vehicle incudes a traveling mechanism driven by a rotational power from an engine and an implement for effecting a ground work by the rotational power of the engine. The work vehicle further includes a load ratio calculation section 53 for calculating an engine load ratio indicative of an engine load of the engine, a ground speed calculation section 51 for calculating a ground speed of the vehicle body with using satellite positioning data, a slip ratio calculation section 52 for calculating a slip ratio indicative of slippage of the traveling mechanism relative to a ground surface by using the ground speed, a traveling work control section 4 for creating an appropriate traveling work state by controlling a rotational speed of the engine and a posture of the implement, and a traveling work management section 50 for outputting a state changing command that commands a change of the traveling work state, based on the engine load ratio and the slip ratio.

7 Claims, 4 Drawing Sheets

(51) Int. Cl.
*A01B 61/00* (2006.01)
*B60W 10/06* (2006.01)
*B60W 10/30* (2006.01)

(52) U.S. Cl.
CPC ....... *B60W 10/30* (2013.01); *B60W 2300/152* (2013.01); *B60W 2510/0652* (2013.01); *B60W 2520/26* (2013.01); *B60W 2710/0661* (2013.01); *B60W 2710/30* (2013.01)

(58) Field of Classification Search
USPC .................. 56/10.2 R; 172/2–11; 701/48, 50
See application file for complete search history.

(56) References Cited

U.S. PATENT DOCUMENTS

| | | | | |
|---|---|---|---|---|
| 8,849,521 | B2 * | 9/2014 | Ishikawa | A01B 63/1145 |
| | | | | 701/50 |
| 8,909,440 | B2 * | 12/2014 | Ishikawa | A01B 63/112 |
| | | | | 701/50 |
| 2012/0239260 | A1 | 9/2012 | Ishikawa et al. | |

FOREIGN PATENT DOCUMENTS

| | | |
|---|---|---|
| JP | 5369108 | 6/1978 |
| JP | 200078905 A | 3/2000 |
| JP | 4634172 B | 2/2011 |
| JP | 2012191857 A | 10/2012 |
| JP | 201494591 A | 5/2014 |
| JP | 5727822 B2 | 6/2015 |

* cited by examiner

WORK VEHICLE

CROSS-REFERENCE TO RELATED APPLICATIONS

This application is the United States national phase of International Application No. PCT/JP2016/086595 filed Dec. 8, 2016, and claims priority to Japanese Patent Application No. 2016-105364 filed May 26, 2016, the disclosures of which are hereby incorporated in their entirety by reference.

TECHNICAL FIELD

The present invention relates to a work vehicle including a traveling mechanism driven by a rotational power from an engine mounted on a vehicle body and an implement for effecting a ground work in association with traveling of the vehicle body.

BACKGROUND ART

As an example of such work vehicle as above, a tractor disclosed in Patent Document 1 includes a ground work implement liftably mounted on a vehicle body which travels by a traveling device, and the ground work implement is controlled (draft controlled) for its lifting up/down based on a traction load value detected by a traction load sensor. Further, there is provided a slip ratio obtaining means for obtaining a slip ratio of the traveling device relative to the ground surface. If the slip ratio obtained by this slip ratio obtaining means exceeds a threshold value, under the draft control, the ground work implement will be lifted up to a target vehicle body level value higher than a value preset by the draft control. Namely, when slippage occurs in the traveling device, by elevating the ground work implement appropriately, traveling load is reduced for suppressing occurrence of slippage.

Also, a work vehicle disclosed in Patent Document 2 includes a drive switching means for switching over between a four-wheel drive state in which driving force is transmitted to front wheels and rear wheels and a two-wheel drive state in which driving force is transmitted only to the rear wheels and a slip ratio detecting means for detecting a slip ratio of the wheels relative to a contacted ground surface. When the work vehicle is tilted in a front-rear direction and also the slip ratio exceeds a threshold value, the drive mode is switched from the two-wheel drive state to the four-wheel drive state. Conversely, when the tiling and the slip ratio decrease, the drive mode is switched from the four-wheel drive state to the two-wheel drive state.

BACKGROUND ART DOCUMENTS

Patent Documents

Patent Document 1: Japanese Unexamined Patent Application Publication No. 2012-191857
Patent Document 2: Japanese Unexamined Patent Application Publication No. 2014-094591

With the conventional work vehicles described above, a work state and/or a traveling state is/are changed in accordance with a slip ratio which is calculated from a vehicle speed (an actual speed, a ground speed) based on positioning data from a positioning satellite and from vehicle speed based on wheel rotation (an apparent velocity). More particularly, in the case of the work vehicle according to Patent Document 1, lifting control of the ground work implement is effected in accordance with the slip ratio. In the case of the work vehicle according to Patent Document 2, switchover is effected between the two-wheel drive state and the four-wheel drive state in accordance with the slip ratio. In the case of a ground work vehicle, the vehicle frequently employs a constant speed work-implementing travel in which a work is implemented while the vehicle travels at a constant speed, so detection of speed reduction due to slippage and taking a certain countermeasure therefor are important. However, causes of unexpected speed reduction of a work vehicle include not only slippage, but also reduction in engine rotational speed due to increase of engine load.

In view of the state of the art described above, there is a need for a technique that allows appropriate detection of an unexpected vehicle speed change in a work vehicle and that allows also execution of appropriate control for such vehicle speed change.

SOLUTION

A work vehicle according to the present invention comprises:
a vehicle body mounting an engine;
a traveling mechanism driven by a rotational power from the engine;
an implement for effecting a ground work in association with traveling of the vehicle body;
a load ratio calculation section for calculating an engine load ratio indicative of an engine load of the engine;
a ground speed calculation section for calculating a ground speed of the vehicle body with using satellite positioning data;
a slip ratio calculation section for calculating a slip ratio indicative of slippage of the traveling mechanism relative to a ground surface by using the ground speed;
a traveling work control section for creating an appropriate traveling work state by controlling a rotational speed of the engine and a posture of the implement; and
a traveling work management section for outputting a state changing command that commands a change of the traveling work state, based on the engine load ratio and the slip ratio.

With the above-described configuration, to the traveling work control section, an engine load ratio and a slip ratio are inputted via the traveling work management section. Then, the traveling work control section adjusts a speed or a torque of rotational power to be transmitted to the traveling mechanism by controlling the rotational speed of the engine and adjusts also the load applied to the implement by controlling the posture of this implement. Namely, in accordance with the engine load ratio and the slip ratio, the traveling work control section outputs a state changing command to an appropriate relevant control section (e.g. an engine controller for controlling an engine rotational speed, an implement controller for controlling posture of the implement, or a traveling controller for controlling a speed changer device of the traveling mechanism) to maintain the traveling work state appropriate. With utilization also of an engine load ratio as an input parameter for changing a traveling work state, the above configuration allows for more appropriate traveling work state change than the conventional technique that effects changing of the traveling work state in accordance with change in the slip ratio only.

During a traveling work, if no increase occurs in the engine load or in the slip amount, in consideration to work efficiency and energy saving, there is possibility of changing to a traveling work state for higher efficiency by positively applying an additional load. Therefore, it will be important to seek for more efficiency-wise appropriate traveling work state by monitoring changes occurring in the engine load and the slip amount while positively applying more severe conditions (i.e. additional load) to the engine and/or the implement. For this reason, as a first control rule, according to one preferred embodiment of the present invention, the traveling work management section is configured to output a state changing command for changing the traveling work state to more efficient traveling work state, on the condition that the engine load ratio is below a predetermined load lower threshold value AND that the slip ratio is below a predetermined slip lower threshold value.

In case increase occurs in the slip ratio, but not in the engine load ratio during a traveling work, this may be considered that slippage is occurring due to high load to the implement though the engine still has some spare power or that the ground is slippery. Therefore, it will be advantageous to temporarily reduce the load of the implement to check whether expected improvement will result in the slip ratio or not. For this reason, as a second control rule, according to one preferred embodiment of the present invention, the traveling work management section is configured to output a state changing command for reducing load of the implement, on the condition that the engine load ratio is below a predetermined load lower threshold value AND that the slip ratio exceeds a predetermined slip upper threshold value.

During a traveling work, if increase occurs in the engine load ratio, but not in the slip ratio, and also if the implement is a device which provides a driving force such as rotary cultivator, the above situation may indicate that the ground speed has become higher unexpectedly as the vehicle body is being pushed by the implement. Therefore, it will be advantageous to temporarily increase the engine rotational speed and to check resultant change in the engine load. For this reason, as a third control rule, according to one preferred embodiment of the present invention, the traveling work management section is configured to output a state changing command for increasing a rotational speed of the engine, on the condition that the engine load ratio exceeds a predetermined upper threshold value AND that the slip ratio is below a predetermined lower threshold value.

In the above-described three control rules, the lower threshold value of the engine load is appropriate for a value which is same as or lower than an average value of engine load in a standard traveling work. And, the upper threshold value of the engine load is appropriate for a value which is same as or higher than the average value of engine load in the standard traveling work. Also, the lower threshold value of the slip ratio is appropriate for a value which is same as or lower than an average value of slip ratio in the standard traveling work. And, the upper threshold value of the slip ratio is appropriate for a value which is same as or higher than the average value of slip ratio in the standard traveling work. These respective threshold values can be set different for the respective control rules.

Reduction in the ground speed (vehicle speed) of the work vehicle at the time of constant-speed work-implementing travel is attributable mainly to occurrence of slippage between the traveling mechanism and the ground surface and increase in the engine load (reduction in the engine rotational speed). In a situation involving no occurrence of slippage, but involving engine load increase alone, there is high possibility of occurrence of engine torque shortage relative to the load of the implement. Therefore, to cope with this situation, it is conceivable either to increase the engine rotational speed or to reduce the implement load. Also, in a situation involving no increase in the engine load, but involving occurrence of slippage alone, there is high possibility of the implement load being too high in spite of some spare power remaining in the engine torque or of the traveling mechanism traveling in a muddy ground or rocky or stony ground. Therefore, to cope with this situation, it is conceivable either to reduce the ground speed or to reduce the implement load. Notwithstanding, such reduction of ground speed is often attributable to both occurrence of slippage and occurrence of engine load increase. For this reason, it will be advantageous to effect a traveling work state change for changing an engine rotational speed and/or changing posture of the implement, based on a ratio between a degree of contribution of slippage occurrence and a degree of contribution of engine load increase, to the reduction in the ground speed. For this reason, according to one preferred embodiment of the present invention, the traveling work management section includes a contribution ratio estimation section for estimating a contribution ratio of the slip ratio and a contribution ratio of the engine load to the reduction in the ground speed at time of reduction in the ground speed and the traveling work management section is configured to output the state changing command based on the contribution ratios.

A control function section of the traveling work management section configured to extract output parameters constituting a control command to the various actuators constituting the state changing command can take simply form of a lookup table or the like. But, this section can also be comprised by using a machine-learning algorithm. Further alternatively, in case the control function section of the traveling work management section is constituted of a certain principle such as a "rule-based", threshold values obtained experimentally and/or empirically can be used advantageously. For instance, the traveling work management section can be configured to output a state changing command for reducing load of the implement, if the contribution ratio of the slip is higher than the contribution ratio of the engine load, by a value exceeding a predetermined threshold value. Also, the traveling work management section can be configured to output a state changing command for increasing the engine rotational speed, if the contribution ratio of the engine load is higher than the contribution ratio of the slip, by a value exceeding a predetermined threshold value.

EMBODIMENTS

Figure 1:
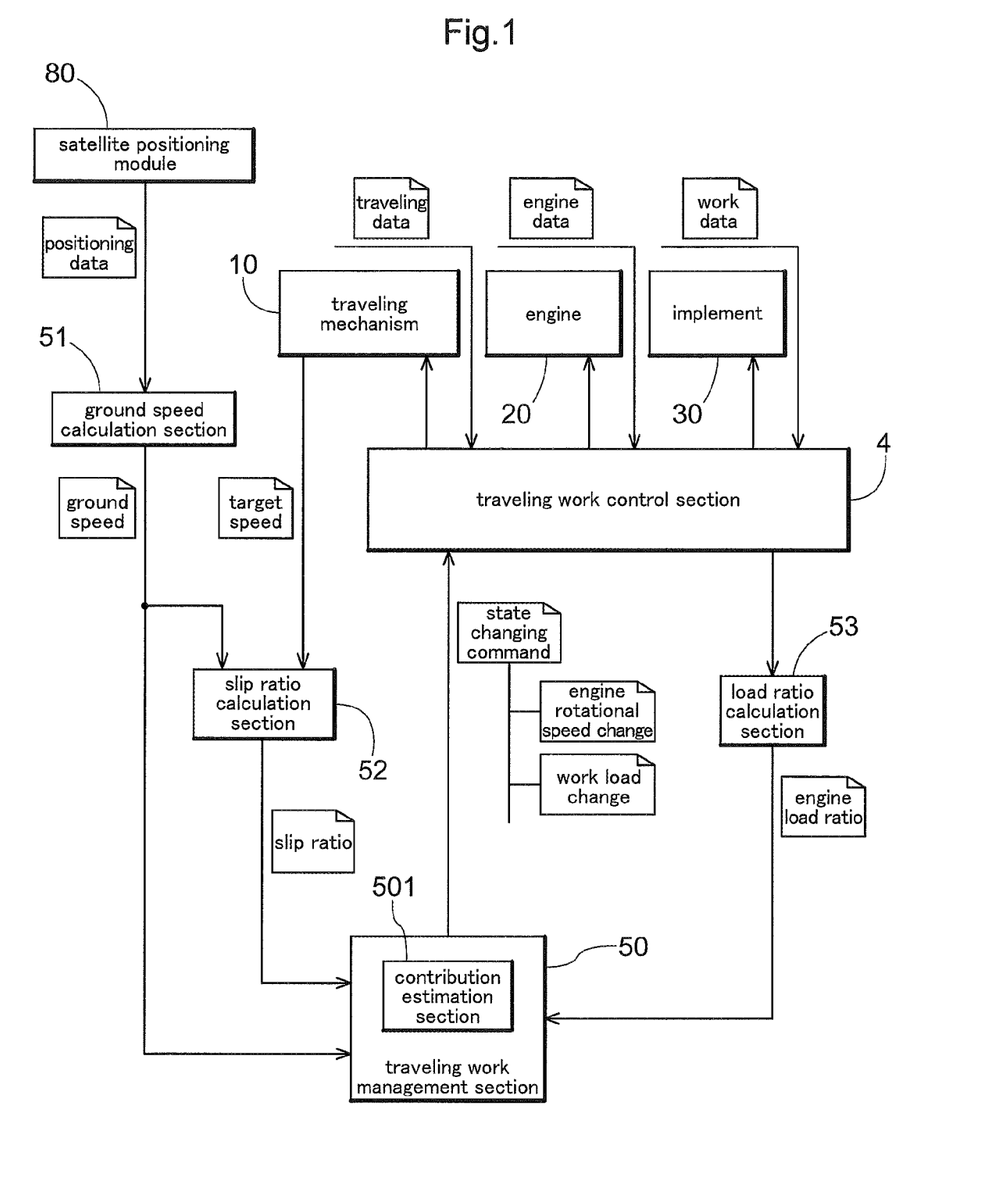
FIG. 1 is an explanatory view for explaining basic principle of control for changing a traveling work state based on an engine load ratio and a slip ratio.

Before explaining a specific embodiment of a work vehicle relating to the present invention, a basic principle of control for effecting a change in a traveling work state based on an engine load ratio and a slip ratio at the time of a ground work of the work vehicle will be explained. Here, the work vehicle includes an engine 20 as a power source, a traveling mechanism 10 constituted of a transmission, drive wheels, etc. and an implement 30 such as a cultivator, for effecting a ground work in association with traveling. This work vehicle further incudes a satellite positioning module 80 constituted of e.g. a GNSS module or the like, which outputs positioning data indicative of a coordinates position of the vehicle body (to be referred to simply as a "self-vehicle position" hereinafter). Such self-vehicle position represented by the positioning data will be based on a position of an antenna. In this example, however, a position correction processing is effected such that the self-vehicle position does not represent an antenna position, but an appropriate position of the vehicle (e.g. a ground working position of the implement 30).

Based on the self-vehicle positions obtained by a predetermined time interval based on positioning data from the satellite positioning module 80, it is possible to calculate a ground speed which is an actual moving speed of the work vehicle. Further, it is possible to calculate also a rotational speed (here, this will be referred to as a "target speed") which is the circumferential speed of drive wheels constituting the traveling mechanism 10.

The engine 20 feeds a rotational power to the traveling mechanism 10 for traveling. As the implement 30 effects the ground work during traveling, there will be generated a work load associated with this ground work. In such case, the engine 20 will be subjected to not only a traveling load for driving the traveling mechanism 10, but also to a work load due to the implement 30. Accordingly, controlling of the traveling mechanism 10, controlling of the engine 20 and controlling of the implement 30 will be carried out in coordination with each other. To this end, a traveling work control section 4 inputs traveling data indicative of a state of the traveling mechanism 10, engine data indicative of a state of the engine 20, and work data indicative of a state of the implement 30. The traveling work control section 4 has a traveling control function for controlling operational devices of the traveling mechanism 10, an engine control function for controlling operational devices of the engine 20, and an implement control function for controlling operational devices of the implement 30.

The work vehicle, through controlling the engine 20 and the traveling mechanism 10, will control such that the implement 30 will effect a ground work while the vehicle is traveling at a constant speed (a target speed) (a constant vehicle speed such as 5 km/h, 10 km/h, etc.). However, even when controlling is being effected to keep the engine rotational speed constant, if an excessive load is applied to the engine 20 due to increase in the traveling load and/or the work load described above, there occurs reduction in the engine rotational speed. Therefore, if there occurs reduction in the actual engine rotational speed relative to the target engine rotational speed, this will be understood as application of an excessive load to the engine 20. Then, based on this phenomenon, a load ratio calculation section 53 calculates an engine load ratio.

When there is no slippage occurring between the drive wheels and the ground surface, the target speed and the ground speed will be in agreement with each other. Whereas, if a difference occurs between the target speed and the ground speed, this means occurrence of slippage in the drive wheels. Therefore, a slip ratio calculation section 52 calculates a slip ratio based on a target speed and a ground speed.

In order to create an appropriate traveling work state by combination of the rotational speed of the engine 20 and the posture of the implement 30, the traveling work control section 4 controls the engine 20 and the implement 30 and also the traveling mechanism 10 when necessary. Various kinds of parameters for creating an appropriate traveling work state are set as default data. However, as these are realized under ideal conditions, some adjustment will be needed in an actual traveling work. In the present invention, in order to obtain as optimal as possible work result (improvement in work efficiency, etc.) under whatever conditions, a traveling work management section 50 outputs a state changing command for commanding a change in the traveling work state to the traveling work control section 4. And, this state changing command will be derived, based on an engine load ratio calculated by the load ratio calculation section 53 and a slip ratio calculated by the slip ratio calculation section 52. The state changing command comprises basically a command for the engine 20 and the implement 30, so this command includes a command for increasing/decreasing an engine rotational speed, a command for changing posture or position of the implement, in order to optimize engine load or work load.

Next, there will be shown examples of control rules according to which such state changing commands are outputted. However, control rules are not limited thereto.

(1) If the engine load ratio is below a predetermined load lower threshold value AND the slip ratio is below a predetermined slip lower threshold value, there will be outputted a state changing command for changing the traveling work state to a more efficient traveling work state. Here, the "more efficient traveling work state" means a state that can lead to speed increase of the traveling work, or an increase in the amount of the traveling work.

(2) If the engine load ratio is below the predetermined load lower threshold value AND the slip ratio exceeds a predetermined slip upper threshold value, there will be outputted a state changing command for reducing the load of the implement 30.

(3) If the engine load exceeds the predetermined upper load threshold value AND the slip ratio is below the predetermined slip lower threshold value, there will be outputted a state changing command for increasing the rotational speed of the engine 20.

The threshold values employed in the respective control rules can be numeral values obtained statistically in advance or numeral values derived by arithmetical operations from data groups contained in work histories of various work vehicles.

The engine load ratio and the slip ratio can vary, either in dependence on each other or independently of each other. Further, increases of the engine load ratio and the slip ratio respectively invite reduction in the ground speed of the work vehicle. In other words, in the case of reduction in the ground speed, it will be possible to output an appropriate state changing command by estimating which one of engine load increase and slip increase contributes more to this ground speed reduction. Then, to this end, the traveling work management section 50 incorporates therein a contribution estimation section 501 for estimating a contribution ratio of the slip ratio and a contribution ratio of the engine load to the reduction in the ground speed and has a function of driving a state changing command from these contribution ratios.

Figure 2:
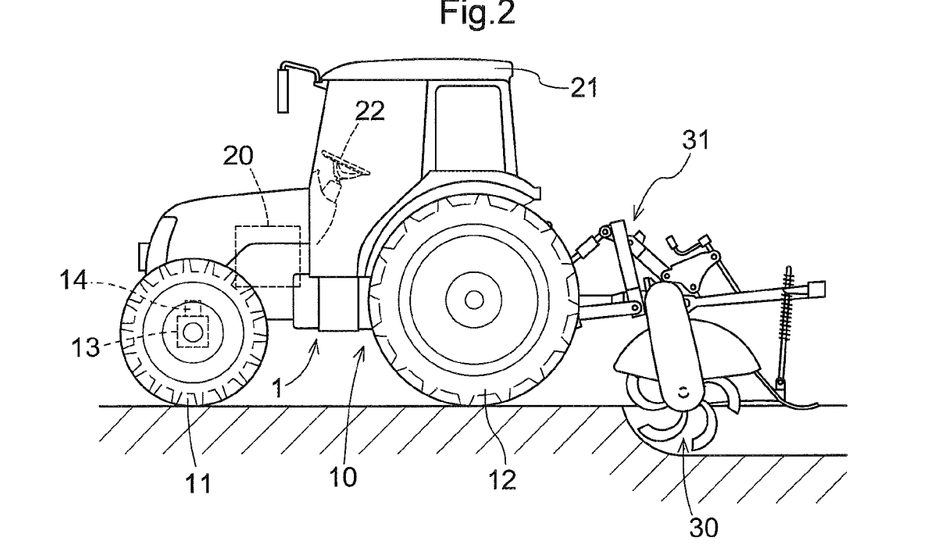
FIG. 2 is a side view of a tractor showing one embodiment of a work vehicle.

Next, one specific embodiment of the work vehicle relating to the present invention will be explained. In the instant embodiment, the work vehicle, as shown in FIG. 2, is a tractor mounting the implement 30 such as a rotary cultivator for effecting an agricultural work, cultivation work etc., on a field (work site) delimited by ridges or the like. In this tractor 10, a maneuvering area is provided at a center portion of a vehicle body 1 which is supported by front wheels 11 and rear wheels 12 constituting the traveling mechanism 10. The traveling mechanism 10 includes also a transmission having a speed changer device, etc. in addition to the front wheels 11 and the rear wheels 12. At a front portion of the vehicle body, there is mounted the engine 20 for transmitting a rotational power to the traveling mechanism 10. At a rear portion of the vehicle body 1, there is mounted the implement 30 which is a rotary cultivator, via a hydraulic lift mechanism 31. Rotational power of the rotary cultivator is fed by the engine 20. Therefore, the higher the traveling speed (ground speed) of the vehicle body 1 and the greater the depth of the cultivation by the rotary cultivator, the greater the load to be applied to the engine 20. The front wheels 11 function as steering wheels and by changing a steering angle thereof, a traveling direction of the tractor is changed. The steering angle of the front wheels 11 is changed by an operation of a steering mechanism 13. This steering mechanism 13 includes a steering motor 14 for automatic steering. At time of manual traveling, steering of the front wheels 11 can be made by operating a steering wheel 22. In a cabin 21 of the tractor, there is provided a satellite positioning module 80 constituted as a GNSS module. Though not shown, a satellite antenna for receiving GPS signals or GNSS signals is mounted to a ceiling area of the cabin 21. Incidentally, the satellite positioning module 80 can include an inertial navigation module incorporating a gyro acceleration sensor, a geomagnetic direction sensor etc., in order to assist the satellite navigation. Needless to say, the inertial navigation module can be provided at a site different from the satellite positioning module 80.

Figure 3:
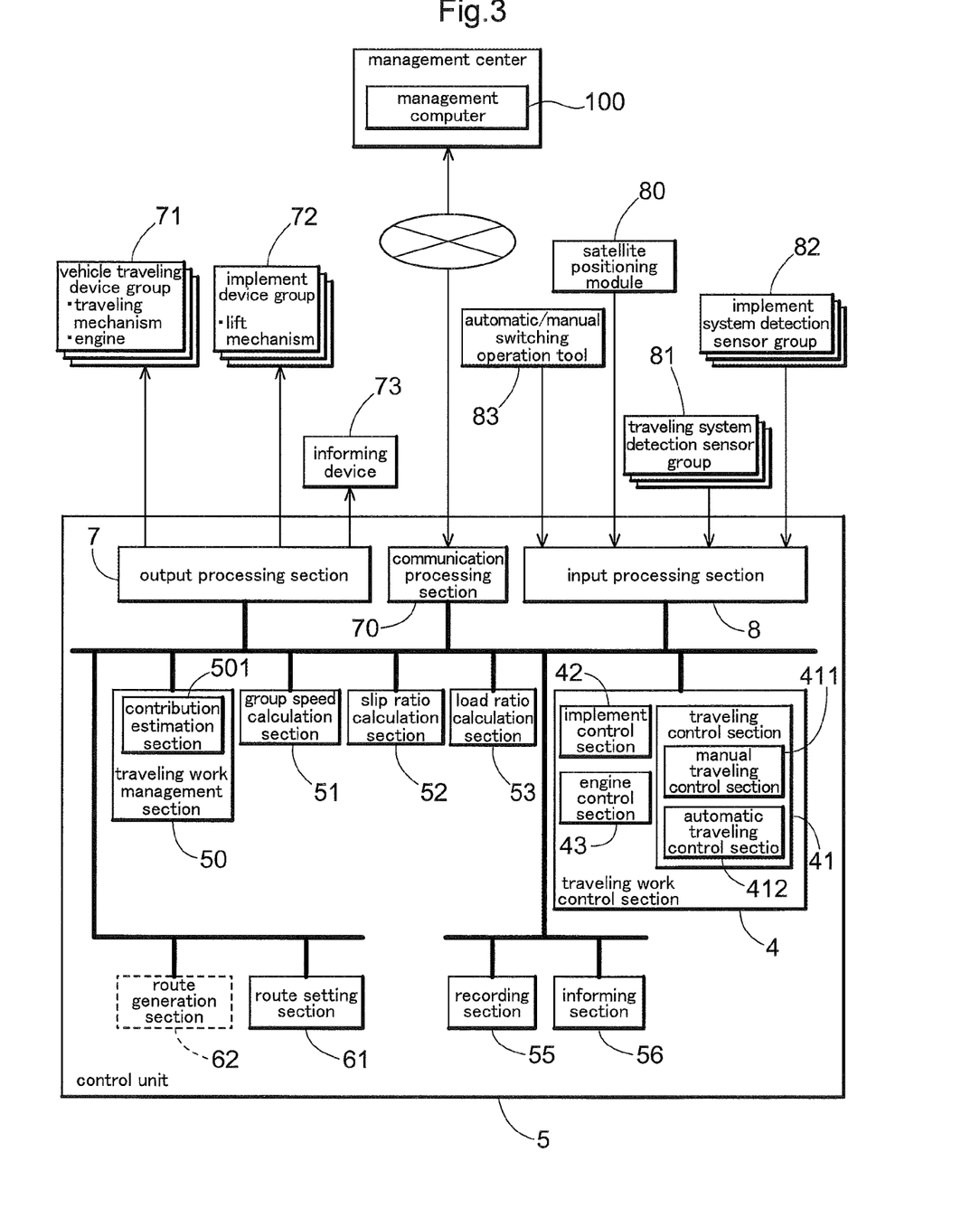
FIG. 3 is a functional block diagram showing a control system of the tractor.

FIG. 3 shows a control system built in this tractor. This control system employs the basic principle which was explained above with reference to FIG. 1. A control unit 5 which is the core component of this control system includes an output processing section 7, an input processing section 8 and a communication processing section 70, which function as input/output interfaces. The output processing section 7 is connected to a vehicle traveling device group 71, an implement device group 72, an informing device 73, etc. The vehicle traveling device group 71 includes control devices relating to vehicle traveling, e.g. an engine controller, a speed change controller, a brake controller, a steering controller, etc. The implement device group 72 includes a driving mechanism for the implement 30 which is a rotary cultivator in the instant embodiment, a lift cylinder controller for the lift mechanism 31 for lifting up/down the rotary cultivator, etc. The communication processing section 70 has functions of transmitting data processed by the control unit 5 to a management computer 100 built at the remote management center and receiving various data from the management computer 100. The informing device 73 includes a flat display panel, a lamp, a buzzer and informs a driver or an operator of various kinds of information desired to be informed to the driver or operator in visual or audible form. Signal transmission between the informing device 73 and the output processing section 7 is effected in either wired or wireless manner.

The input processing section 8 is connected to the satellite positioning module 80, a traveling system detection sensor group 81, an implement system detection sensor group 82, an automatic/manual switching operation tool 83, etc. The traveling system detection sensor group 81 includes sensors for detecting traveling states such as an engine rotational speed, a speed change state, and so on. The implement system detection sensor group 82 includes sensors for detecting a position or a tilting of the implement 30, a senor for detecting work load, etc. The automatic/manual switching operation tool 83 is a switch for selecting either an automatic traveling mode for traveling by automatic steering and a manual steering mode for traveling by the manual steering. For instance, if the automatic/manual switching operation tool 83 is operated during traveling in the automatic steering mode, switchover is made to traveling by the manual steering. Conversely, if the automatic/manual switching operation tool 83 is operated during traveling in the manual steering mode, switchover is made to traveling by the automatic steering.

The control unit 5 incorporate those functional sections described above with reference to FIG. 1, namely, the traveling work control section 4, the ground speed calculation section 51, the slip ratio calculation section 52, the load ratio calculation section 53, the traveling work management section 50. The traveling work control section 4 includes a traveling control section 41 for controlling operational devices of the traveling mechanism 10, the implement control section 42 for controlling operational device of the implement 30 and the engine control section 43 for controlling the operational devices of the engine 20. The traveling work control section 4 sets an engine rotational speed, a speed change position, posture of the implement 30 (cultivation depth), in order to create a target traveling work state from the implement 30 mounted on the vehicle body 1 and situation of the field, for realizing optimal work efficiency of the implement 30. Settings for the various kinds of controllers for creating such target traveling work state can be determined in advance. On the other hand, if a current traveling work state deviates from the target traveling work state due to occurrence of slippage from a field state, or reduction in the engine rotational speed from excessive engine load, the traveling work management section 50 will provide a state changing command based on an engine load ratio and/or a slip ratio to the traveling work control section 4 in order to change such current traveling work state.

The ground speed calculation section 51 obtains a ground speed (actual vehicle speed) of the vehicle body 1, from self-vehicle positions calculated based on positioning data transmitted in sequence from the satellite positioning module 80 and periods required for traveling between two calculated self-vehicle positions. This slip ratio calculation section 52 calculates a slip ratio from an apparent vehicle speed calculated from an axle rotational speed of the rear wheels 12 and an actual vehicle speed calculated by the ground speed calculation section 51.

A graph (a table) showing relationship between reduction amounts of engine rotational speed (engine drop amounts) from a reference rotational speed which is an engine rotation speed at time of zero load and torque changes is produced in advance for each accelerator opening degree. Then, based on this graph, an engine load ratio is calculated from a partial load degree which is calculated from a current engine rotational speed and a maximum load degree. Here, the engine load ratio is defined simply as a value which becomes greater in correspondence with increase in the reduction amount of the engine rotational speed. Since such engine load ratio is used for engine control, in case the engine load ratio is handled by the engine control section 43, the load ratio calculation section 53 may employ this engine load ratio.

Based on a ground speed, a slip ratio and an engine load ratio, the traveling work management section 50 will give a state changing command to the traveling work control section 4 in order to improve work efficiency, in case it has been determined that a traveling work state created by the traveling work control section 4 should be changed. For example, if the ground speed decreases during a constant-speed work implanting traveling, the cultivation pitch of the implement 30 will be too small under this state. So, the command can be provided for increase of the engine rotational speed, decrease of the cultivation depth, change of the speed, etc. Further, in case the ground speed is being kept constant and any reduction in the engine rotational speed is not occurring, either, this means that the work is currently being carried out in a favorable manner. However, in such case, conversely, it may be considered that there is some spare power available for the traveling work. So, the traveling work management section 50 can output a state changing command for e.g. further improving the work efficiency through small increase in the vehicle speed, or small increase in the cultivation depth, etc.

Further, reduction in the ground speed can be attributable to two main causes, namely, reduction of engine rotational speed due to increased engine load and occurrence of slippage. Thus, the traveling work management section 50 in this embodiment incorporates the contribution estimation section 501 for estimating a contribution ratio of the slip ratio and a contribution ratio of the engine load to the reduction in the ground speed and has a function of determining contents of a state changing command in accordance with such contribution ratios.

This tractor is capable of traveling under both automatic traveling (automatic steering) and manual traveling (manual steering). Therefore, the traveling control section 41 includes a manual traveling control section 411 as well as an automatic traveling control section 412. In this automatic traveling, the vehicle travels along a preset target traveling route, so there is provided a route setting section 61 for setting such target traveling route.

Generation of the target traveling route is done by the control unit 5 and/or the management computer 100. In case the generation of the target traveling route is done in the control unit 5, this control unit 5 will be equipped with a route generation section 62 having a route generation algorithm. Whereas, in case the generation of the target traveling route is done in the management computer 100, generated target traveling route will be sent from the management computer 100 to the control unit 5 and set by the route setting section 61. The automatic traveling control section 412 calculates any direction error and position error between the target traveling route and the self-vehicle position and generates an automatic steering instruction and outputs this to the steering motor 14 (see FIG. 2) included in the vehicle traveling device group 71 via the output processing section 7. Both the manual traveling control section 411 and the automatic traveling control section 412 together constituting the traveling control section 41 can provide a constant vehicle speed command to the traveling mechanism 10 for traveling at a constant vehicle speed. With this, in either the automatic traveling or the manual traveling, a constant speed vehicle traveling for traveling with automatically maintaining a constant vehicle speed (or, a different vehicle speed may be employed for straight traveling and turning traveling) is possible.

The data inputted to the control unit 5 or the data generated in the control unit 5 will be recorded in the recording section 55, so that designated data in the recorded data will be forwarded to the management computer 100 by a real-time processing or a batch processing.

The control unit 5 further includes an informing section 56. In case various kinds of data handled by the control unit 5 exceed a predetermined allowable range or in case a state changing command is outputted by the traveling work management section 50, the informing section 56 generates informing data for informing its contents via the informing device 73.

Figure 4:
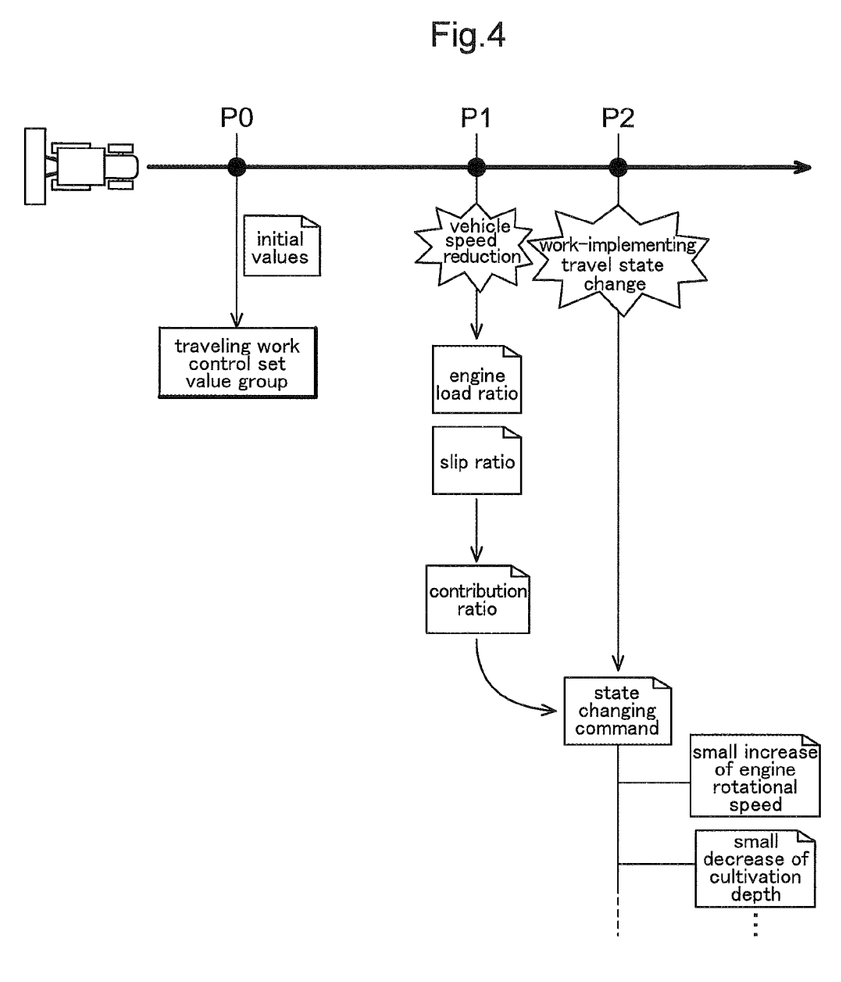
FIG. 4 is an explanatory view illustrating an example of work-implementing travel state changing control in a cultivation work using the tractor at a constant vehicle speed.

Next, with reference to FIG. 4, there will be briefly explained an example of a work-implementing travel state in a cultivation work at a predetermined constant vehicle speed using the tractor. Firstly, at time of traveling work start: P0, initial values (default values) presumably optimal for the present field and the implement 30 are set in a group of traveling work control setting values in the traveling work control section 4 for controlling various controllers. After the traveling work is started and at a certain location: P1, a vehicle speed reduction (ground speed reduction) exceeding a threshold value occurs. Based on an engine load ratio and a slip ratio calculated at this timing, their contribution ratios will be estimated. Based on the vehicle speed reduction amount, the engine load ratio and the slip ratio, it is determined whether to change the current work-implementing travel state or not. In this regard, even when the determination made indicates no need for changing the current work-implementing travel state, this determination process will be carried out continuously as long as vehicle speed reduction exceeding the threshold value is occurring. At a location: P2, determination result indicating need for changing the current work-implementing travel state is outputted, then, the traveling work management section 50 will generate a state changing command capable of changing the current work-implementing travel state appropriately, based on the inputted parameters (vehicle speed reduction amount, engine load ratio, slip ratio), and will give this state changing command to the traveling work control section 4. This state changing command includes small decrease/increase of engine rotational speed, small decrease/increase of cultivation depth, small decrease/increase of constant vehicle speed value, etc. With repeating such changes of work traveling state, the work-implementing travel will be carried out to realize the optimal work-implementing travel state.

In the example explained above with reference to FIG. 4, a work implanting traveling state change was made, based on contribution ratios of engine load ratio and slip ratio relative to vehicle speed reduction. Instead, such change can be made based on a control rule using the above-described threshold values. Further alternatively, it is also possible to employ an arrangement of selecting between a work-implementing travel state change using contribution ratios and a work-implementing travel state change using a control rule or an arrangement using these in mixed state.

[Other Embodiments]

(1) In the foregoing embodiment, as a work vehicle, there was cited a tractor mounting a rotary cultivator as the work implement 30. However, aside such tractor, the work vehicle can be embodied as other various kinds of work vehicles such as an agricultural vehicle such as a rice planter, a fertilizer, a combine, or a work vehicle such as a civil engineering vehicle having a dozer, a roller, etc. as the implement 30.

(2) The respective functional sections shown in the functional block diagrams shown in FIGS. 1 and 2 are sectioned for the sake of explanation, mainly. In actuality, however, the respective functional sections can be combined or can be further divided in sub sections, if necessary.

INDUSTRIAL APPLICABILITY

The present invention is applicable to a work vehicle that effects a ground work while grasping a ground speed using satellite positioning data.

DESCRIPTION OF REFERENCE MARKS/NUMERALS

1: vehicle body
4: traveling work control section
5: control unit
7: output processing section
8: input processing section
10: traveling mechanism
20: engine
30: implement
31: lift mechanism
41: traveling control section
411: manual traveling control section
412: automatic traveling control section
42: implement control section
43: engine control section
50: traveling work management section
501: contribution ratio estimation section
51: ground speed calculation section
52: slip ratio calculation section
53: load ratio calculation section
55: recording section
56: informing section
70: communication processing section
71: vehicle traveling device group
72: implement device group
73: informing device
100: management computer

The invention claimed is:

1. A work vehicle comprising:
a vehicle body mounting an engine;
a traveling mechanism including a transmission and driven by a rotational power from the engine;
an implement for effecting a ground work in association with traveling of the vehicle body;
a load ratio calculation section for calculating an engine load ratio indicative of an engine load of the engine;
a ground speed calculation section for calculating a ground speed of the vehicle body using satellite positioning data;
a slip ratio calculation section for calculating a slip ratio indicative of slippage of the traveling mechanism relative to a ground surface by using the ground speed;
a traveling work control section for creating an appropriate traveling work state by controlling a rotational speed of the engine and a posture of the implement;
an engine control section provided in the traveling work control section and controlling an operational device of the engine;
an implement control section provided in the traveling work control section and controlling an operational device of the implement;
a traveling control section provided in the traveling work control section and controlling an operational device of the traveling mechanism; and
a traveling work management section for outputting a state changing command that commands a change of the traveling work state controlled by the rotational speed of the engine and the posture of the implement, based on the engine load ratio and the slip ratio.

2. The work vehicle of claim 1, wherein the traveling work management section is configured to output a state changing command for changing the traveling work state to a more efficient traveling work state, on the condition that the engine load ratio is below a predetermined load lower threshold value AND that the slip ratio is below a predetermined slip lower threshold value.

3. The work vehicle of claim 1, wherein the traveling work management section is configured to output a state changing command for reducing load of the implement, on the condition that the engine load ratio is below a predetermined load lower threshold value AND that the slip ratio exceeds a predetermined slip upper threshold value.

4. The work vehicle of claim 1, wherein the traveling work management section is configured to output a state changing command for increasing the rotational speed of the engine, on the condition that the engine load ratio exceeds a predetermined upper threshold value AND that the slip ratio is below a predetermined lower threshold value.

5. A work vehicle comprising:
a vehicle body mounting an engine;
a traveling mechanism driven by a rotational power from the engine;
an implement for effecting a ground work in association with traveling of the vehicle body;
a load ratio calculation section for calculating an engine load ratio indicative of an engine load of the engine;
a ground speed calculation section for calculating a ground speed of the vehicle body using satellite positioning data;
a slip ratio calculation section for calculating a slip ratio indicative of slippage of the traveling mechanism relative to a ground surface by using the ground speed;
a traveling work control section for creating an appropriate traveling work state by controlling a rotational speed of the engine and a posture of the implement;
a traveling work management section for outputting a state changing command that commands a change of the traveling work state, based on the engine load ratio and the slip ratio,
wherein the traveling work management section includes a contribution ratio estimation section for estimating a contribution ratio of the slip ratio and a contribution ratio of the engine load to a reduction in the ground speed at time of reduction in the ground speed during constant speed traveling work and the traveling work management section is configured to output the state changing command based on the contribution ratios.

6. The work vehicle of claim 5, wherein the traveling work management section is configured to output a state changing command for reducing load of the implement, if the contribution ratio of the slip is higher than the contribution ratio of the engine load, by a value exceeding a predetermined threshold value.

7. The work vehicle of claim 5, wherein the traveling work management section is configured to output a state changing command for increasing the rotational speed of the engine, if the contribution ratio of the engine load is higher than the contribution ratio of the slip, by a value exceeding a predetermined threshold value.

* * * * *